United States Patent
Xue

(10) Patent No.: US 12,266,223 B2
(45) Date of Patent: Apr. 1, 2025

(54) PARKING LOT MANAGEMENT AND CONTROL METHOD BASED ON OBJECT ACTIVITY PREDICTION, AND ELECTRONIC DEVICE

(71) Applicant: Xi'an Creation Keji CO., Ltd., Xi'an (CN)

(72) Inventor: Geni Xue, Xi'an (CN)

(73) Assignee: XI'AN CREATION KEJI CO. ,LTD., Xi'An (CN)

( * ) Notice: Subject to any disclaimer, the term of this patent is extended or adjusted under 35 U.S.C. 154(b) by 448 days.

(21) Appl. No.: 17/256,911

(22) PCT Filed: Dec. 26, 2020

(86) PCT No.: PCT/CN2020/139754
§ 371 (c)(1),
(2) Date: Sep. 30, 2022

(87) PCT Pub. No.: WO2022/134120
PCT Pub. Date: Jun. 30, 2022

(65) Prior Publication Data
US 2023/0222844 A1    Jul. 13, 2023

(51) Int. Cl.
G06K 9/00          (2022.01)
G06T 7/73          (2017.01)
G06V 20/52         (2022.01)
G07B 15/02         (2011.01)

(52) U.S. Cl.
CPC ............... *G07B 15/02* (2013.01); *G06T 7/73* (2017.01); *G06V 20/52* (2022.01); *G06T 2207/30232* (2013.01)

(58) Field of Classification Search
CPC . G06T 7/73; G06T 2207/30232; G06V 20/52; G06V 10/454; G06V 10/82; G06V 20/54
See application file for complete search history.

(56) References Cited

U.S. PATENT DOCUMENTS 7,437,006 B2 * 10/2008 Bascle ................... G06V 10/48
                                                      382/224
7,881,531 B2 *  2/2011 Bascle ................... G06V 10/25
                                                      382/173
(Continued)

FOREIGN PATENT DOCUMENTS

| CN | 111242025 A | * | 6/2020 | ......... G06K 9/00335 |
| EP | 3270364 A3 | * | 2/2018 | ......... G06K 9/00771 |
| WO | WO-2007066877 A1 | * | 6/2007 | ............. G07B 15/02 |

OTHER PUBLICATIONS

Vehicle Detection Based on the And-Or Graph for Congested Traffic Conditions, Ye Li et al., IEEE, 2013, pp. 984-993 (Year: 2013).*

(Continued)

*Primary Examiner* — Jayesh A Patel
(74) *Attorney, Agent, or Firm* — WPAT, PC

(57) ABSTRACT

A parking lot management and control method based on object activity prediction, an electronic device and a storage medium are provided. The method includes: obtaining a scene video of a parking lot; detecting and tracking objects in the scene video to generate a spatial AND-OR graph model of the parking lot, the spatial AND-OR graph model representing spatial position relationships of the objects in the scene video; performing a sub-activity extraction on the spatial AND-OR graph model to obtain a sub-activity tag set representing activity states of concerned ones of the objects; inputting the sub-activity tag set into a temporal AND-OR graph model to obtain a future activity prediction result of concerned objects in the parking lot; and transmitting control information based on the future activity prediction result of the concerned objects to a device corresponding to the parking lot.

20 Claims, 5 Drawing Sheets

(56) References Cited

U.S. PATENT DOCUMENTS

| | | | | |
|---|---|---|---|---|
| 8,589,315 | B2* | 11/2013 | Medasani | G06F 18/2111 |
| | | | | 706/62 |
| 10,607,084 | B1* | 3/2020 | Tang | G06F 16/7837 |
| 10,949,672 | B1* | 3/2021 | Tang | G06T 7/70 |
| 11,003,860 | B2* | 5/2021 | Fang | G06N 20/00 |
| 11,657,713 | B2* | 5/2023 | Maruiwa | G08G 1/149 |
| | | | | 701/23 |
| 2014/0324864 | A1* | 10/2014 | Choe | G06F 16/73 |
| | | | | 707/737 |

OTHER PUBLICATIONS

Learning And-Or Model to Represent Context and Occlusion for Car Detection and Viewpoint Estimation, Tianfu Wu, et al., IEEE, 2016, pp. 1829-1843 (Year: 2016).*
A Causal And-Or Graph Model for Visibility Fluent Reasoning in Tracking Interacting Objects, Yuanlu Xu et al., CVF, 2007, pp. 2178-2187 (Year: 2007).*
Joint Inference of Groups, Events and Human Roles in Aerial Videos, Tianmin Shu et al., CVF, 2015, pp. 4576-4584 (Year: 2015).*
Robot Learning with a Spatial, Temporal, and Causal And-Or Graph, Caiming Xiong et al., IEEE, 2016, pp. 2144-2151 (Year: 2016).*
Moving Object Detection and Tracking Using a Spatio-Temporal Graph in H.264/AVC Bitstreams for Video Surveillance, Houari Sabirin et al., IEEE, 2012, pp. 657-668 (Year: 2012).*
Learning Lane Graph Representations for Motion Forecasting, Ming Liang et al., arXiv, 2020, pp. 1-18 (Year: 2020).*

* cited by examiner

PARKING LOT MANAGEMENT AND CONTROL METHOD BASED ON OBJECT ACTIVITY PREDICTION, AND ELECTRONIC DEVICE

TECHNICAL FIELD

The disclosure relates to the field of parking lot management and control, and more particularly to a parking lot management and control method based on object activity prediction, an electronic device and a non-transitory computer-readable storage medium.

BACKGROUND

A Parking lot is a place which is crowded with people and motor vehicles. A video monitoring device is typically used to monitor the condition of the parking lot, such that safety is ensured and effective management and control is implemented.

The current behavior of each object in the parking lot through detecting and analyzing a surveillance video. However, this detection technology is a post-event detection solution, which can't predict a future activity of the object, so it can't respond to the future activity in time, or can't avoid the occurrence of safety events in time, such as vehicle collision. Therefore, it is impossible to effectively manage and control the parking lot.

SUMMARY

The embodiment of the disclosure aims to provide a parking lot management and control method and device based on object activity prediction, an electronic device and a storage medium, so as to realize the purpose of accurately and quickly predicting activities of objects in the parking lot, thereby effectively managing and controlling the parking lot. The specific technical solution is as follows. In a first aspect, the embodiment of the disclosure provides a parking lot management and control method based on object activity prediction, including: obtaining a scene video of a parking lot; detecting and tracking objects in the scene video to generate a spatial AND-OR graph model of the parking lot, where the spatial AND-OR graph model represents spatial position relationships of the objects in the scene video; performing a sub-activity extraction on the spatial AND-OR graph model to obtain a sub-activity tag set representing activity states of concerned ones of the objects; inputting the sub-activity tag set into a temporal AND-OR graph model to obtain a future activity prediction result of the concerned ones of the objects in the parking lot, where the temporal AND-OR graph model is obtained according to a pre-established object-activity corpus of in the parking lot; and transmitting control information, based on the future activity prediction result of the concerned ones of the objects, to a device corresponding to the parking lot.

Optionally, detecting and tracking objects in the scene video to generate a spatial AND-OR graph model of the parking lot, includes: detecting the objects in the scene video by using a pre-trained object detection network to obtain attribute informations of the objects in each of frame images of the scene video, where the attribute informations include position informations of bounding boxes of the respective objects; matching the same object in the frame images of the scene video, based on the attribute informations of the objects in each of the frame images, by using a preset multi-object tracking algorithm; determining an actual spatial distance between different ones of the objects in each of the frame images; and generating the spatial AND-OR graph model of the parking lot according to the attribute informations of the objects in each of the frame images after the matching and the actual spatial distance.

Optionally, the object detection network includes a YOLO_v3 network, and the preset multi-object tracking algorithm includes a DeepSort algorithm.

Optionally, determining an actual spatial distance between different ones of the objects in each of the frame images, includes: determining a pixel coordinate of each of the objects in each of the frame images; for each of the objects, calculating an actual coordinate in a world coordinate system corresponding to the pixel coordinate of the object by using a monocular vision positioning and ranging method; and for each of the frame images, obtaining the actual spatial distance between each two of the objects in the frame image according to the actual coordinates of the two objects. Optionally, performing a sub-activity extraction on the spatial AND-OR graph model to obtain a sub-activity tag set representing activity states of concerned ones of the objects, includes: determining paired objects of which the actual spatial distance is less than a preset distance threshold in the spatial AND-OR graph model as the concerned ones of the objects; for each of the frame images, determining the actual spatial distance of each paired objects in the concerned ones of the objects and speed values of the concerned ones of the objects; comparing every successive two of the frame images of the scene video in sequence to obtain distance change information representing changes of the actual spatial distance of each paired objects in the concerned ones of the objects and to obtain speed change information representing changes of the speed values of the concerned ones of the objects; and describing the distance change information and the speed change information associated with the concerned ones of the objects by semantic tags to generate the sub-activity tag set representing the activity states of the concerned ones of the objects.

Optionally, inputting the sub-activity tag set into a temporal AND-OR graph model to obtain a future activity prediction result of the concerned ones of the objects in the parking lot, includes: inputting the sub-activity tag set into the temporal AND-OR graph model, and obtaining the future activity prediction result of the concerned ones of the objects in the parking lot by using an online symbol prediction algorithm of an Earley parser, where the future activity prediction result includes future sub-activity tags and probabilities of occurrence of the concerned ones of the objects.

Optionally, transmitting control information, based on the future activity prediction result of the concerned ones of the objects, to a device corresponding to the parking lot, includes: transmitting the control information indicating a toll to a toll device at an exit of the parking lot, in a situation of the future activity prediction result indicating a distance between a vehicle and a fence at the exit of parking lot being less than a preset distance.

In a second aspect, an embodiment of the disclosure provides an electronic device including a processor, a communication interface, a memory and a communication bus, where the processor, the communication interface and the memory are mutually communicated with one another through the communication bus; the memory is configured to store a computer program; and the processor is configured to execute the computer program stored in the memory to carry out a parking lot management and control method based on object activity prediction according to the embodiment of the disclosure.

In a third aspect, an embodiment of the disclosure provides a non-transitory computer-readable storage medium, in which a computer program is stored, and when executed by a processor, causes the processor to carry out the parking lot management and control method based on object activity prediction according to the embodiment of the disclosure.

In the solutions according to the embodiment of the disclosure, a spatio-temporal AND-OR graph is introduced into the field of object activity prediction for the first time. Firstly, the objects in the scene video of the parking lot are detected and tracked, and a spatial AND-OR graph model of the parking lot is generated, where the spatial AND-OR graph model represents a spatial position relationships of the objects. Secondly, a sub-activity extraction is performed on the spatial AND-OR graph model to obtain a sub-activity tag set of the concerned objects and realize advanced semantic extraction of the scene video. Then, the sub-activity tag set is taken as an input of the pre-obtained temporal AND-OR graph model, and a prediction of the next sub-activity is obtained through a temporal syntax of the temporal AND-OR graph model. Finally, the prediction results are used to send control information to the corresponding device of the parking lot to realize the management control of the parking lot. The embodiment of the disclosure can improve the accuracy and instantaneity of the object activity prediction by using the spatio-temporal AND-OR graph, so that the activity of the object in the parking lot can be accurately and quickly predicted, and the purpose of effectively controlling the parking lot can be achieved.

DETAILED DESCRIPTION OF EMBODIMENTS

The technical solutions in embodiments of the disclosure will be described clearly and completely with reference to the drawings in the embodiments of the disclosure. Obviously, the described embodiments are only part of the embodiments of the disclosure, not all of them. Based on the embodiments of the disclosure, all other embodiments obtained by those of ordinary skill in the art without a creative labor fall in the scope of protection of the disclosure.

An accurate and rapid prediction of activities of the objects in the parking lot can be realized, so that the purpose of effectively management and control of the parking lot is realized. An embodiment of the disclosure provides a parking lot management and control method based on object activity prediction.

It should be noted that an executive body of the parking lot management and control method based on object activity prediction according to the embodiment of the disclosure can be a parking lot management and control device based on object activity prediction, which may be operated in an electronic device. The electronic device may be a server or a terminal device, of course, it is not limited thereto.

In a first aspect, a parking lot management and control method based on object activity prediction according to an embodiment of the disclosure is introduced.

Figure 1:
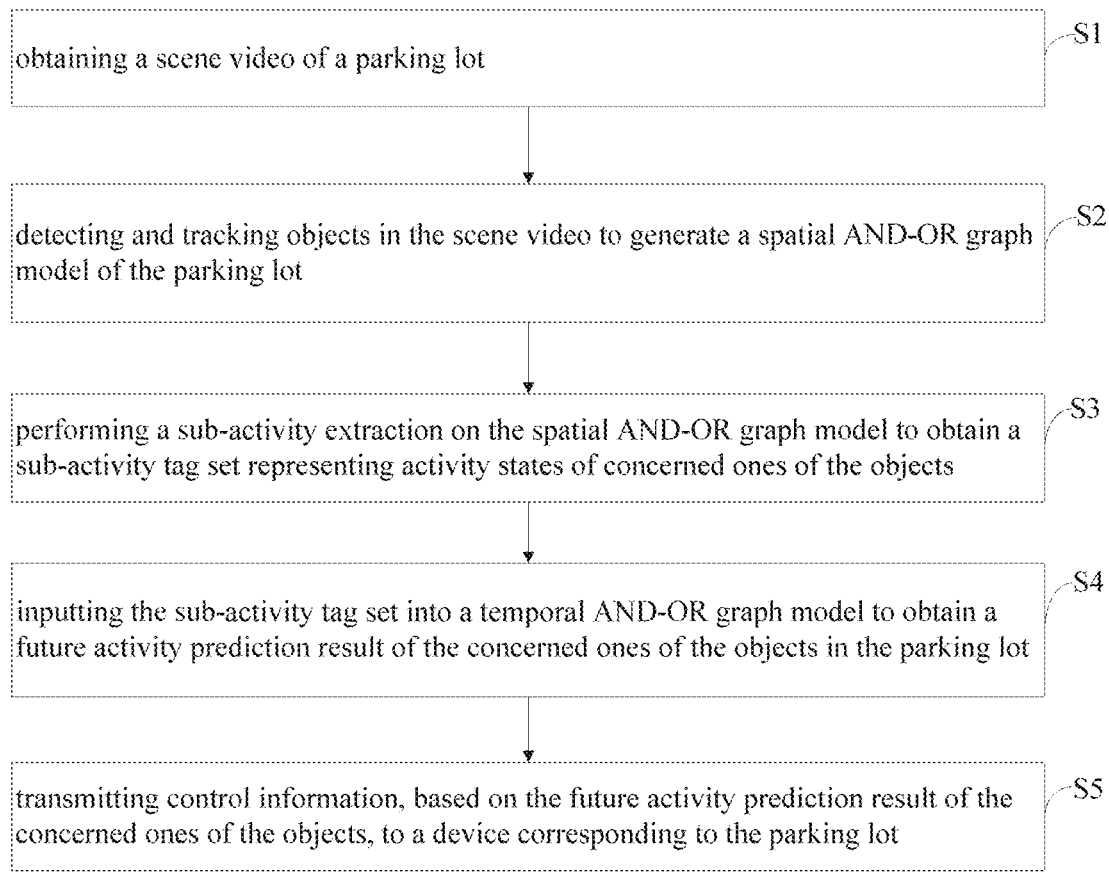
FIG. 1 is a schematic flowchart of a parking lot management and control method based on object activity prediction, according to an embodiment of the disclosure.

As shown in FIG. 1, a parking lot management and control method based on object activity prediction according to an embodiment of the disclosure may include the following steps S1 to S5:

In step S1, a scene video of a parking lot is obtained.

In an embodiment of the disclosure, the scene video at least contains a moving object, which may be a person, a vehicle, an animal and the like.

The scene video may be obtained by a video shooting device placed at the parking lot. The video shooting device may include a camera head, a video camera, a camera, a mobile phone and the like. For example, the scene video may be shot by the camera head placed on a ceiling of the parking lot.

According to an embodiment of the disclosure, the scene video of the parking lot may be obtained from the video shooting device through a communication manner. The communication manner is not limited to wireless communication, wired communication, etc.

It should be understood that the obtained scene video includes multiple frame images.

In step S2, the objects in the scene video are detected and tracked to generate a spatial AND-OR graph model of the parking lot.

In an embodiment of the disclosure, the spatial AND-OR graph model represents the spatial position relationships of the objects in the scene video.

For purpose of understanding the present solution, concepts related to an AND-OR graph in this portion are firstly introduced.

Figure 2:
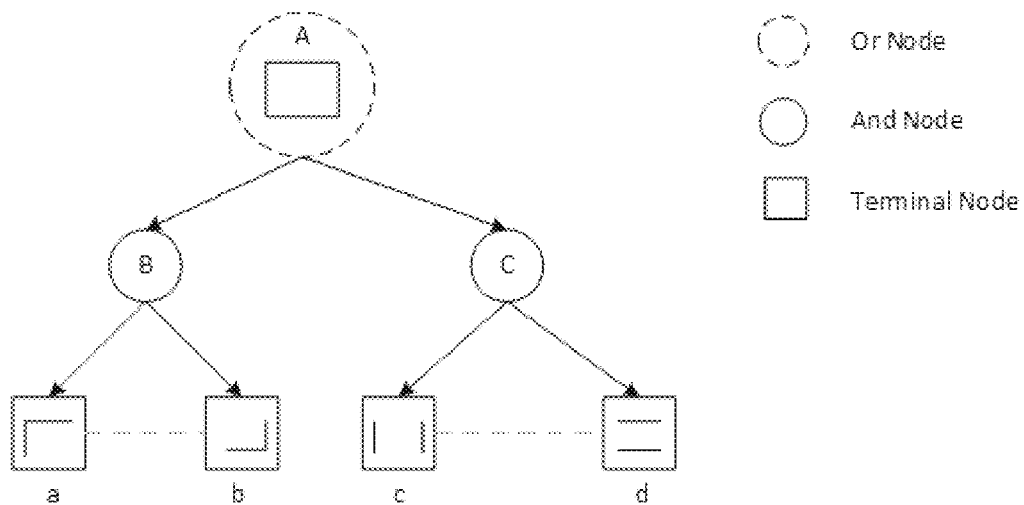
FIG. 2 is an example diagram of an AND-OR graph in a related art.

The AND-OR graph (AOG) is a hierarchical combination model of stochastic context-free grammar (SCSG), which is used to indicate hierarchical decomposition of a group of nodes including a terminal node and non-terminal nodes from a top to leaf nodes, and summarize the basic concepts in image grammar. Specifically, an AND node indicates that an object is decomposed, and an OR node indicates an alternative sub-configuration. Reference is made to FIG. 2, which is an example diagram of an AND-OR graph in the related art. One AND-OR graph includes three types of nodes: an AND node (a filled circle as shown in FIG. 2); an OR node (a dotted circle as shown in FIG. 2); a terminal node (a rectangle as shown in FIG. 2). The AND node indicates that an entity is decomposed into various parts. The AND node corresponds to a grammar rule, such as B→ab, C→cd shown in FIG. 2. A Horizontal link between child nodes of the AND node indicates a spatial positional relationship and a constraint. The OR node acts as a "switch" of a substructure capable of being replaced, and represents a classification tag at various levels, such as a scene, an object and a part category. The OR node corresponds to a rule, such as A→B|C shown in FIG. 2. Due to this recursive definition, AND-OR graphs of many objects or scene categories can be incorporated into one larger AND-OR graph. Theoretically, all scenes and object categories may be represented by a huge AND-OR graph. The terminal node nay be also referred as a leaf node, which is a high-level semantic visual dictionary based on pixels. The terminal node may appear in all levels of the AND-OR graph due to a scaling attribute. Each terminal node obtains an instance from a specific collection, which is called a dictionary containing various complex image patches. An element in the collection can be indexed by a variable, such as a type, a geometric transformation, a deformation, an appearance change, and the like of the element. As shown in FIG. 2, the leaf nodes of a rectangle A include four visual dictionaries, abcd. The AND-OR graph defines a context-related image representation syntax, in which the terminal node is a visual vocabulary of the context-related image representation syntax, and the AND node and the OR node are generation rules of the context-related image representation syntax.

The AND-OR graph contains all possible parse graphs (pg), which is a possible configuration for generating an object in the AND-OR graph. The parse graph is interpreted as an image. The parse graph pg is composed of a hierarchical parse tree pt and multiple relationships E (defined as "horizontal edges").

$$pg=(pt,E) \quad (1)$$

Figure 3:
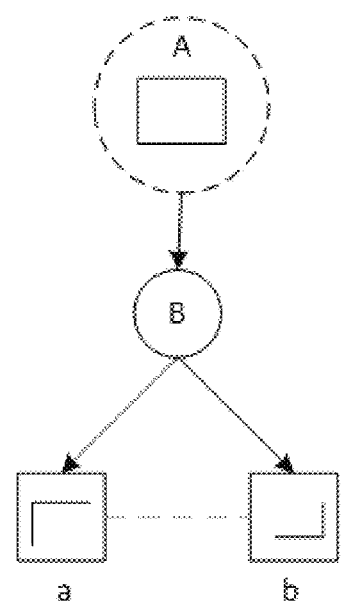
FIG. 3 is a parse graph with respect to FIG. 2.

The Parse tree pt is also an "And" tree in which the non-terminal nodes are AND nodes. The generation rule decomposes each AND node into various parts, which herein is used to generate a configuration, rather than a character string. Reference is made to FIG. 3, which is an parse graph with respect to FIG. 2, in which the generated configuration relationship is r:B→C=<a, b>, where C indicates the configuration. With regard to a probability model in the AND-OR graph, it mainly relates to probability is a learning probability at the OR node, which is used to indicate the probability of a generated configuration. Further, there is another parse graph including nodes c and d with respect to FIG. 2, which is not shown herein.

For the AND-OR graph, a small part dictionary is used to represent the objects in the image hierarchically through the AND node and OR node of the AND-OR graph. This model can reflect a spatial combination structure of the objects in the image, and may be also referred as a Spatial AND-OR graph (S-AOG) model. Based on the spatial position relationships of the objects, the spatial AND-OR graph model is configured to layer and combine components of each object to represent the object through different spatial configurations. Therefore, the spatial AND-OR graph model may be used to analyze a position relationships of each object in image analysis, so as to realize specific applications such as object location and tracking. For example, object recognition and tracking of a complex scene such as a traffic intersection and a square, and the like.

Specifically, step S2 may include the following steps.

Firstly, the objects in the scene video are detected, and a category and a position of each of the objects in each frame image are determined. Herein, the category includes a person, a car, an animal and the like, for distinguishing the types of objects to which each of the objects belongs; and the location may for example be an area range and coordinate of each object in the image.

Herein, any object detection method may be used, such as a traditional front and back background segmentation and an object clustering algorithm, or an object detection method based on deep learning, which are all reasonable.

Secondly, the same object in different frame images by using an object tracking technology.

The purpose of object tracking is to locate a position of each object in each frame video image and generate a motion trajectory of the object. The object tracking for images is to determine a size and a position of the object in subsequent frames given a size and a position of the object in an initial frame of a video sequence.

In an embodiment of the disclosure, any object tracking technology in the related art may be adopted, such as a tracking method based on a correlation filter or a convolutional neural network (CNN).

Thirdly, a positional relationship such as a distance relationship or a front-back orientation relationship and the like between objects in each frame image is determined.

Finally, spatial relationship decomposition is performed on each object in the frame image to obtain a spatial AND-OR graph of the frame image, and spatial AND-OR graphs corresponding to all frame images in the scene video are incorporated to obtain a spatial AND-OR graph model of the parking lot.

In an optional embodiment, step S2 may include steps S21 to S24.

In step S21, the objects in the scene video are detected by using a pre-trained object detection network to obtain attribute informations of the objects in each of frame images of the scene video.

The object detection network according to an embodiment of the disclosure may include a network such as a Region Convolutional Neural Networks (R-CNN), a Spatial pyramid pooling (SPP) Net, a Fast R-CNN, a Faster R-CNN, a You Only Look Once (YOLO), a Single Shot MultiBox Detector (SSD) and the like.

In an optional embodiment, the object detection network may include a YOLO_v3 network.

The YOLO_v3 network consists of a backbone network and three prediction branches, in which the backbone network is a darknet-53 network. The YOLO_v3 network is a full convolution network, in which a large number of residual skip connections is used, and pooling is abandoned, and a strided convolutions operation (cony's stride) is used to realize down-sampling in order to reduce a gradient negative effect caused by the POOLing. In this network structure, a convolution with a step size of 2 is used for down-sampling. Also, in order to enhance a detection accuracy of the algorithm for a small object, the YOLO_v3 uses up-sample and feature fusion methods similar to Feature Pyramid Networks (FPN) to detect on a feature map of multiple scales. Each of the three prediction branches also has a full convolution structure. Compared with a traditional object detection algorithm, when the pre-trained YOLO_v3 network is used for object detection, accuracy and efficiency of object detection are improved, thereby achieving the purpose of prediction accuracy and real-time.

A structure and specific detection process of the YOLO_v3 network may be obtained with reference to the related prior art, and will be not repeated herein.

Through the pre-trained YOLO_v3 network, the attribute information corresponding to each object in each frame image of the scene video can be obtained. Specifically, the attribute information includes position information of a bounding box in which the object is contained. The position information of the bounding box of the object is represented by (x,y,w,h), in which (x,y) represents a center position coordinate of a current bounding box, w and h represent a width and a height of the current bounding box respectively. It can be understood by those skilled in the art that besides the position information of the bounding box, the attribute information also includes a confidence of the bounding box, which reflects the confidence of the object contained in the bounding box and accuracy of object prediction based on bounding box. The confidence is defined as:

$$\text{confidence} = pr(\text{object}) * \text{IOU}_{pred}^{truth} \quad (2)$$

If there is no object, pr(object)=0 and confidence=0; If there is an object, then pr(object)=1, and confidence=$\text{IOU}_{pred}^{truth}$, which is an Intersection-over-Union of a real bounding box and a predicted bounding box.

It can be understood by those skilled in the art that the attribute information also includes category information of the object. The category information indicates a category of the object, such as a person, a vehicle, an animal and the like. For a vehicle, the category information may specifically include a car, a van, an electric car and the like.

It should be noted that a frame of video image may contain several object, some of which are far away, or too small, or do not belong to "interesting object" in the parking lot, so these are not objects with detection purpose. For example, for the parking lot, moving vehicles and persons are concerned, while roadside fire hydrants are uninterested objects. In this way, in a preferred embodiment, by pre-controlling and adjusting settings of the YOLO_v3 network in a pre-training stage, a preset number of object can be detected for one frame image, for example, the preset number may be 30, 40 and the like. Further, the YOLO_v3 network is trained with marked training samples with detection purpose and thereby to make the YOLO_v3 network have self-learning performance, so that, for an unknown scene video as a test sample, the trained YOLO_v3 network can obtain attribute information corresponding to a preset number of objects with detection purpose in each frame image, thereby improving object detection efficiency and detection pertinence.

Then, before performing step S21, the YOLO_v3 network needs to be pre-trained for the parking lot. Those skilled in the art can understand that sample data used in a pre-training is a sample scene video and sample attribute information in the parking lot scene, where the sample attribute information includes category information of object in each frame image of the sample scene video and position information of a bounding box in which the object is contained.

The pre-training process may be summarized to include the following steps.

1) The attribute information of the object of each frame image of the sample scene video is taken as a corresponding true value of each frame image, and each frame image and the corresponding true value are trained through the YOLO_v3 network to obtain a training result of each frame image.

2) The training result of each the frame image is compared with the true value corresponding to each the frame image to obtain an output result corresponding to the frame image.

3) A loss value of the network is calculated according to the output result corresponding to each the frame image.

4) Parameters of the network are adjusted according to the loss value, and steps 1) to step 3) are repeated until the loss value of the network satisfies a certain convergence condition, that is, the loss value reaches a minimum, which means that the training result of each the frame image is consistent with the true value corresponding to the frame image, thus the training of the network is completed, and thus the pre-trained YOLO_v3 network is obtained.

For the parking lot, it is necessary to obtain a large number of sample scene videos in advance. The large number of sample scene videos is marked manually or by machine to obtain the category information of the object corresponding to each frame image in each sample scene video and the position information of the bounding box containing the object. Through the pre-training process, the YOLO_v3 network has the object detection performance in this scene.

In an optional embodiment, the pre-trained YOLO_v3 network is obtained based on a training process on a motion analysis and re-identification set (MARS) dataset and a Vehicle Re-ID Datasets Collection. It should be understood by those skilled in the art that the MARS dataset and the Vehicle Re-ID Datasets Collection are both open source datasets. Specifically, the MARS dataset is aimed at pedestrians, while Vehicle Re-ID Datasets Collection is aimed at vehicles.

In step S22, the same object in the frame images of the scene video is matched based on the attribute informations of the objects in each of the frame images, by using a preset multi-object tracking algorithm.

Early object detection and tracking is mainly based on pedestrian detection, in which, a detection idea is mainly that detection is implemented based on a traditional feature point detection method, and then tracking is implemented by using filtering and matching feature points. Early pedestrian detection, such as pedestrian detection based on Histogram of Oriented Gradient feature (HOG), has various problems such as missed detection, false alarm and repeated detection. With the development of a deep convolution neural network in recent years, there have been many methods of object detection and tracking based on high-precision detection results.

As there are multiple objects in the parking lot in the embodiment of the disclosure, it is necessary to use a Multiple Object Tracking (MOT) algorithm to realize object tracking. A multi-object tracking problem can be regarded as a data association problem, which aims to correlate cross-frame detection results in video frame sequences. By tracking and detecting the object in the scene video by using a preset multi-object tracking algorithm, bounding boxes and an Identity document (ID) of the same object in different frames of the scene video can be obtained, that is, the matching of the same object in each frame image can be realized.

In an optional embodiment, the preset multi-object tracking algorithm may include a Simple Online and Realtime Tracking (SORT) algorithm.

A tracking-by-detection (TDB) is used in the SORT algorithm, in which a Kalman filter tracking as a tracking means is used to realize an object motion state estimation, and a Hungarian assignment algorithm is used for position matching. The SORT algorithm does not use any object appearance features in the process of object tracking, but only uses the position and the size of the bounding box for object motion estimation and data association. Therefore, the complexity of the SORT algorithm is low, the tracker can achieve the speed of 260 Hz, and the object tracking and detection speed is fast, which can meet the real-time requirements in the scene video of the embodiment of the disclosure.

Since the SORT algorithm does not consider an occlusion problem, and does not re-recognize the object by its appearance features, it is more suitable for parking lots with no occlusion, such as parking lots with low crowd density and no occlusion.

In another optional embodiment, the preset multi-object tracking algorithm may include a Simple online and realtime tracking with a deep association metric (DeepSort) algorithm.

The DeepSort is an improvement on the basis of the SORT object tracking, which uses the Kalman filter algorithm for trajectory preprocessing and state estimation and correlates with Hungarian algorithm. On the basis of improving the SORT algorithm, the DeepSort algorithm also introduces a deep learning model trained offline on a pedestrian recognition data set. When tracking objects in real-time video, in order to improve the occlusion of objects and frequent switching of the ID of the object, nearest neighbor matching is performed by extracting the depth apparent features of objects. A core idea of the DeepSort is to use a recursive Kalman filter to track the data association between each frame image. The DeepSort adds a Deep Association Metric based on the SORT, which aims to distinguish different pedestrians. In addition, appearance information is added to realize tracking of an object occluded for a long time. This algorithm is faster and more accurate than the SORT in real-time multi-object tracking.

Specific tracking processes of the SORT algorithm and the DeepSort algorithm may be obtained from a relevant prior art, and will not be repeated herein.

In step S23, an actual spatial distance between different ones of the objects in each of the frame images is determined.

Through the object detection and tracking in the previous steps, the position information of each object in each frame image in the scene video can be obtained, only the position information of each object itself is not enough to characterize the relationship of each object in the parking lot. Therefore, in this step, the actual spatial distance between different objects in each frame of images needs to be determined, and the spatial composition relationship of the objects needs to be determined by using the actual spatial distance between the two objects. In this way, an accurate result can be obtained when the spatial AND-OR graph model is used for prediction.

In an alternative embodiment, the actual spatial distance between the two objects in the image may be determined by using a principle of an equal proportion scale. Specifically, an actual spatial distance between two tested objects can be measured in a scene (a parking lot scene in this solution), and a frame image containing the two tested objects can be shot, and then a pixel distance between the two tested objects in the image can be calculated, so as to obtain an actual number of pixels corresponding to unit length in the actual scene, such as the actual number of pixels corresponding to 1 meter. Then, for two new objects between which an actual spatial distance needs to be detected, taking the pixel number corresponding to the unit length in reality as a factor, a pixel distance of these two objects in a frame of images shot in the scene can be scaled in equal proportion by using the formula, so as to obtain the actual spatial distance of these two objects.

It should be understood that this solution is simple and feasible, and it is more suitable for a situation of image with no distortion. In the case of image distortion, a pixel coordinate and a physical coordinate are not in one-to-one correspondence, so it is necessary to correct the distortion. For example, a cvInitUndistortMap and a cvRemap may be used to correct images to eliminate the distortion and so on. The implementation of such equal proportion scale and a specific process of image distortion modification can be understood with reference to the relevant prior art, and will not be repeated herein.

In an alternative embodiment, the actual spatial distance between the two objects in the image can be determined by a monocular measurement of distance.

A monocular camera model can be approximately considered as a pinhole model. That is, a distance measurement is realized by using the principle of pinhole imaging. Optionally, a similar triangle can be constructed according to a spatial position relationship between the camera and the actual object and a position relationship of the objects in the image, and then an actual spatial distance between the objects can be calculated.

Optionally, a horizontal distance $d_x$ and a vertical distance $d_y$ between the actual position of a pixel point of an object and a video shooting device (video camera/camera/camera head) may be calculated according to a pixel coordinate of the pixel point of the object by using a related algorithm of monocular measurement of distance in the prior art, that is, the single visual distance can be realized. Then, an actual coordinate of the pixel point are deduced and calculated according to the known actual coordinate of the video shooting device, the horizontal distance $d_x$ and the vertical distance $d_y$. Then, for two objects in the image, the actual spatial distance between them can be calculated by using the actual coordinates of the two objects.

In an alternative embodiment, the actual spatial distance between the two objects in the image can be determined by calculating the actual coordinate points corresponding to the pixel points of the two objects.

Herein, calculating the actual coordinate points corresponding to the pixel points of the objects is calculating the actual coordinate of the pixel points.

Optionally, the actual coordinates of pixels may be obtained by using a monocular vision positioning and ranging technology.

The monocular vision positioning and ranging technology has the advantages of low cost and fast calculation. Specifically, it can include following two manners.

1) The actual coordinate of each pixel are obtained by positioning measurement interpolation.

Considering the equal scale enlargement of a pinhole imaging model, the measurement can be carried out by directly printing a paper covered with equidistant array dots. Equidistant array points (such as calibration plates) at a higher distance are measured, and then interpolated and scaled up to thereby obtain the coordinate of an actual ground corresponding to each the pixel point. This operation can save manual measurement of painting marks on the ground. After the distance between points on the paper is measured, and then a H/h (height ratio) amplifying is performed, so as to obtain the coordinates of pixels corresponding to the actual ground. In order to avoid the trapezoidal distortion of an upper edge of the image, which makes the marking points on the printing paper difficult to identify, this method needs to prepare equidistant array dot maps with different distances.

2) The actual coordinates of pixel points are calculated according to the similar triangle scale.

The main idea of this manner is still the pinhole imaging model. However, calibration requirements for video shooting device (camera video/camera/camera head) are relatively high, and the distortion caused by the lens itself is relatively small, but this manner is portable and practical. The video shooting device can be calibrated first, such as using MATLAB or OPENCV, and then the pixel coordinates in the image can be converted and calculated.

In the following, an alternative manner is selected from this manner for explanation, and step S23 may include steps S231 to S233.

In step S231, for each the frame image, a pixel coordinate of each of the objects in each of the frame images is determined.

For example, a bounding box in which an object is contained and pixel coordinates of all pixels in the bounding box can be determined as the pixel coordinate of the object; or a pixel on or within the bounding box can be selected as the pixel coordinate of the object, that is, the pixel coordinate of the object nay be used to represent the object, for example, a center position coordinate of the bounding box can be selected as the pixel coordinate of the object.

In step S232, for each of the objects, an actual coordinate in a world coordinate system corresponding to the pixel coordinate of the object is calculated by using a monocular vision positioning and ranging method.

The pixel coordinate of any pixel in the image are known. The camera imaging process involves four coordinate systems: a world coordinate system, a camera coordinate system, an image physical coordinate system (also referred as an imaging plane coordinate system), pixel coordinate system and conversion of these four coordinate systems. In the prior art, a conversion relationship between these four coordinate systems is known and derivable. Then, a coordinate system transformation formula and other methods may be used to calculate the actual coordinates of pixel coordinates of pixel points in the image in the world coordinate system. For example, many open algorithm programs using OPENCV language may be used to obtain the actual coordinates in the world coordinate system from pixel coordinates. Specifically, for example, by inputting the camera's internal parameters, rotation vectors, translation vectors and pixel coordinates in some OPENCV programs, the corresponding world coordinates can be obtained by using the correlation function. Assume that for object A and object B, the actual coordinate of the center position coordinate of the bounding box representing object A in the world coordinate system is $(X_A, Y_A)$, and the actual coordinate of the center position coordinate of the bounding box representing object B in the world coordinate system is $(X_B, Y_B)$. Furthermore, if the object A has an actual height, the actual coordinate of the object A is $$(X_A, Y_A) \times \left(1 - \frac{h}{H}\right).$$

Where h is the actual height of object A and H is the height of video shooting device.

In step S233, for each of the frame images, the actual spatial distance between each two of the objects in the frame image is obtained according to the actual coordinates of the two objects.

It belongs to the prior art to calculate the distance between two points by using the actual coordinate. According to the above example, without considering an actual height of the objects, the actual spatial distance D between the objects A and B is: $D = \sqrt{(X_A - X_B)^2 + (Y_A - Y_B)^2}$. Of course, when considering the actual height of the objects, the process is similar.

Optionally, if multiple pixel coordinates of objects A and B are obtained in step S231, multiple actual distances of objects A and B can be calculated by using multiple pixel coordinates, and then one of the actual distances can be selected as the actual spatial distance of objects A and B according to certain selection criteria, such as selecting the smallest actual distance as the actual spatial distance of objects A and B, which is reasonable.

Specific details of the above solutions can be detailed in computer vision and related concepts of camera calibration, the world coordinate system, the camera coordinate system, image physical coordinate system (also referred as the imaging plane coordinate system) and the pixel coordinate system, as well as visual development, OPENCV related algorithms, LAB VIEW examples, Calibration examples and the like, and will not be repeated herein.

In an optional embodiment, the actual spatial distance between different objects in each frame image can also be determined by using a binocular camera optical image ranging method.

Similar to human eyes, due to the difference in angle and position of two cameras of a binocular camera, the images of the same object taken by the two cameras are different, which is called "parallax", and a size of parallax is related to the distance between the object and the camera, so the object can be located according to this principle. According to the parallax of two images taken by the left and right cameras, the optical image ranging of the binocular camera is calculated. The specific method is similar to that for the monocular camera optical image ranging, but it has more accurate ranging and positioning information than monocular camera. Specifically, the binocular ranging needs to perform image transformation and epipolar matching on the two images. A specific ranging process of the binocular camera optical image ranging method may be obtained from the relevant prior art, and will not be repeated herein.

In an optional embodiment, determining the actual spatial distance between different objects in each frame of images may also include: for each frame image, the actual spatial distance between the two objects in the frame image is obtained by using the depth camera ranging method.

The depth camera ranging method can directly obtain the depth information of the object from the image, and can accurately and quickly obtain the actual spatial distance between the object and the video shooting device without coordinate calculation, so as to determine the actual spatial distance between the two objects. This method has higher accuracy and timeliness. A specific ranging process of the depth camera ranging method may be obtained from the related prior art, and will be not repeated herein.

In step S24, the spatial AND-OR graph model of the parking lot is generated according to the attribute informations of the objects in each of the frame images after the matching and the actual spatial distance.

In this step, for each the frame image, the detected object and the attribute information of the detected object are taken as leaf nodes of the spatial AND-OR graph, and the actual spatial distance between different objects is taken as a spatial constraint of the spatial AND-OR graph, thereby generating the spatial AND-OR graph of the frame image. The spatial AND-OR graph model of parking lot is composed of spatial AND-OR graphs of the all frame images.

Figure 4:
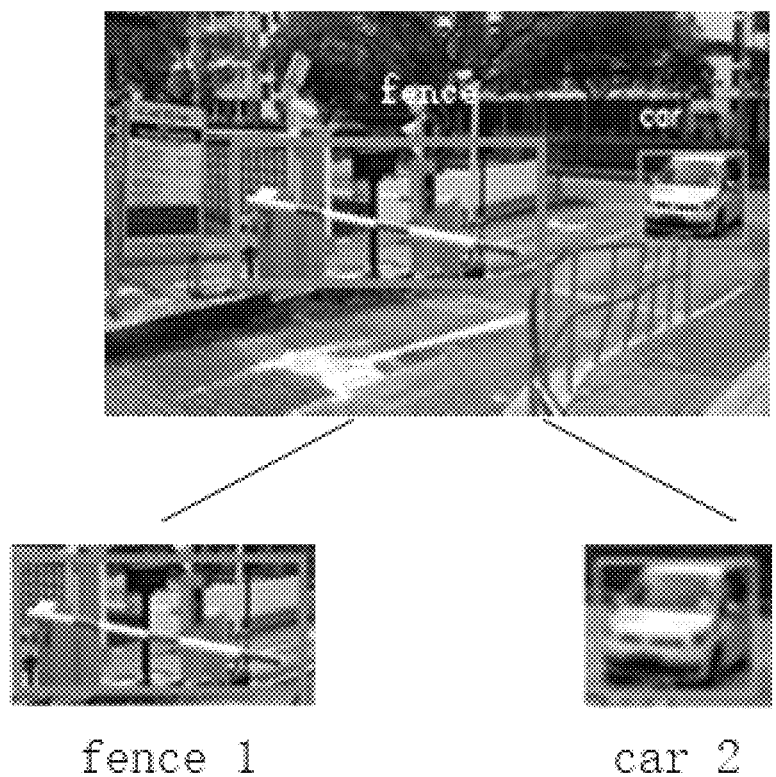
FIG. 4 is a spatial AND-OR graph at a fence of an exemplary parking lot according to an embodiment of the disclosure.

Reference is made to FIG. 4, which is a spatial AND-OR graph at a fence of a parking lot as an example of an embodiment of the disclosure.

The upper picture in FIG. 4 shows a frame image at the fence of the parking lot, which is a root node of the spatial AND-OR graph. Two objects are detected by the aforementioned method, which are left and right pictures in the lower part of FIG. 4. The left picture shows a fence 1 and marked with category information "fence", and a bounding box of the fence is also marked. The right picture shows a car 2, and marked with category information "car", and a bounding box of the vehicle is also marked. The above category information and position information of the bounding box are the attribute information of the objects. Further, for the same object in different frame images, such as the car 2, an ID of the car 2 is also marked to distinguish the vehicle from other objects in different frame images, for example, the ID of the vehicle can be represented by a number or a symbol.

These two objects and the corresponding attribute information are the leaf nodes of the spatial AND-OR graph. Herein, the actual spatial distance between two objects is taken as the spatial constraint of the spatial AND-OR graph (not shown in FIG. 4).

The generation process of a spatial AND-OR graph may be obtained from the description of the relevant prior art, and will not be repeated herein.

Furthermore, after the spatial AND-OR graph model of the parking lot is generated, a spatial position relationship between new scenes and new objects can be generated by using the spatial AND-OR graph model of the parking lot. For example, the spatial AND-OR graph models of upper and lower parking lots can be incorporated to obtain a new spatial AND-OR graph model including multi-story parking lots, thereby realizing scene expansion.

In step S3, a sub-activity extraction is performed on the spatial AND-OR graph model to obtain a sub-activity tag set representing activity states of concerned ones of the objects.

Steps S1 and S2 realize the detection of leaf nodes of the spatial AND-OR graph. In this step, by extracting sub-activities, an event sequence of sub-activity combination is obtained to express the whole event represented by the scene video. It should be noted that the sub-activities extracted in this step are actually the object activities, and the sub-activities are described in terms of leaf nodes of AND-OR graph.

In an optional embodiment, step S3 may include steps S31 to S34.

Before step S31, a subactivity tag set subActivists=null may be initialized, in which subActivists is a string array for storing subactivity tags. Then steps S31 to S34 are executed.

In step S31, paired objects of which the actual spatial distance is less than a preset distance threshold in the spatial AND-OR graph model are determined as the concerned ones of the objects.

Optionally, the paired objects whose actual spatial distance in the spatial AND-OR graph corresponding to a first frame image is less than the preset distance threshold in the spatial AND-OR graph model are determined as the concerned objects.

If the actual spatial distance between two objects is small, it may reflect that there are more active contacts between the two objects, such as approaching and colliding. Therefore, it is necessary to continuously observe the two objects as concerned objects and predict their future activities. On the contrary, if the actual spatial distance between the two objects is very large, it indicates that there is little possibility of activity intersection between the two objects, so it is not required to make corresponding activity prediction.

Therefore, for the first frame image, the actual spatial distance d between different objects is calculated, and the paired objects whose actual spatial distance d is less than the preset distance threshold minDis are determined as the concerned objects. For different parking lots, the preset distance threshold minDis can be set as different sizes. For example, in a parking lot, concerned is paid to the safe distance between objects (vehicle or person), and minDis can be 10 meters.

Optionally, for step S31, it may be:

The paired objects whose actual spatial distance in the spatial AND-OR graph is less than the preset distance threshold in the spatial AND-OR graph model are determined as the concerned ones of the objects.

That is to say, every frame of image except the last frame of image is operated to determine the concerned object, so as to find more concerned objects in time.

In step S32, for each of the frame images, the actual spatial distance of each paired objects in the concerned ones of the objects and speed values of the concerned ones of the objects are determined.

In this step, starting from the first frame image, the actual spatial distance d of the concerned object that is smaller than the preset distance threshold minDis can be saved at Distance x. Distance x is a multidimensional array that stores the actual spatial distance d between different objects. Where x represents a serial number corresponding to an image, for example, x=1 represents the first frame image.

Further, a speed value of the same concerned object in each frame image can be calculated, which refers to the speed of the concerned objects in the current frame of the scene video. The following briefly describes the calculation method of the speed value of the object:

in order to calculate the speed value of an object, it is necessary to obtain a distance s and a time t of the object moving in the front and back frames. Firstly, a frame rate FPS of the camera is calculated. Specifically, in a development software OpenCV, a frames per second FPS of the video may be calculated by using the methods of get (CAP_PROP_FPS) and get(CV_CAP_PROP_FPS).

If one detection process is performed every k frames, the time t can be calculated by a following formula:

$$t = k/\text{FPS}^{(s)} \quad (3)$$

Therefore, the speed value v of the object can be calculated by a following formula:

$$v = \frac{s}{t} = \frac{\sqrt{(X_2 - X_1)^2 + (Y_2 - Y_1)^2}}{t} = \frac{FPS * \sqrt{(X_2 - X_1)^2 + (Y_2 - Y_1)^2}}{t} \quad (4)$$

Herein, $(X_1, Y_1)$ and $(X_2, Y_2)$ represent the actual coordinates of the object in two successive images, respectively, and the actual coordinate of the object can be obtained through step S232. Since the previous frame image and the current frame image are required when calculating the speed value of the object in the current frame image, it can be understood that the speed value of the object can be obtained from the second frame image.

Through the above method, the speed of the concerned object in the video can be calculated and marked in the image. For example, in each the frame image, the corresponding speed value, such as 9.45 m/s, is identified next to the bounding box of each concerned object.

For the same concerned object, the speed value in the first frame image can be represented by v1, the speed value in the second frame image can be represented by v2, . . . , and so on.

In step S33, every successive two of the frame images of the scene video in sequence are compared to obtain distance change information representing changes of the actual spatial distance of each paired objects in the concerned ones of the objects and to obtain speed change information representing changes of the speed values of the concerned ones of the objects.

For example, for two concerned objects, E and F, the actual spatial distance between the two concerned objects in the previous frame image is 30, and the actual spatial distance between them in the later frame image is 20, so it is known that the actual spatial distance between them decreases by comparison, which is the distance change information between the two concerned objects. If the speed value of E in the previous frame image is 8 m/s, and the speed value in the later frame image is 10 m/s, it is known that the speed of E becomes faster, which is its speed change information.

Until the images of all frames are traversed, the distance change information and speed change information of each concerned object which occur sequentially and correspond to each frame image can be obtained.

In step S34, the distance change information and the speed change information associated with the concerned ones of the objects are described by semantic tags to generate the sub-activity tag set representing the activity states of the concerned ones of the objects.

In this step, the distance change information and the speed change information are described in the form of words by semantics, such as acceleration, deceleration, approaching, moving away, etc., to obtain sub-activity tag set representing the activity state of the concerned object. Finally, a sub-activity tag set is obtained from the sub-activity tag set corresponding to each frame image and occurring in turn. The sub-activity tag set indicates the sub-event sequence of collective scene video. According to the embodiment of the disclosure, the description of the scene video is realized by using the sub-activity tag set, that is, the semantic description of the whole video is obtained through the combination of different sub-activities of each object in the video, and the semantic extraction of the scene video is realized.

In the embodiment of the disclosure, the definition of the sub-activity can refer to the definition manner of sub-activity tag in CAD-120 data set, and the shorter tag mode is helpful to summarize the nodes of the AND-OR graph.

To this step, a complete sub-activity tag set subActivists can be obtained.

According to the embodiment of the disclosure, for the parking lot scene, when analyzing object activities (events), sub-activities (i.e., sub-events) in the scene may be defined, and each sub-activity tag may be obtained by the methods of object detection, tracking and speed calculation as mentioned above. The following sub-activity tags can be specifically defined: car_stopping, person_stopping, away, accelerate, decelerate, moving-uniformly, closing, None, closing, away, passing, crash and the like.

It can be understood that if in step S31, each frame image of the scene video except the last frame is operated to determine the concerned object, then the number of attention objects included in the sub-activity tag set obtained from steps S32 to S34 is more, for example, some concerned objects are determined based on the second frame of image, and so on.

Optionally, inputting the sub-activity tag set into the pre-obtained temporal AND-OR graph model to obtain the future activity prediction result of the concerned objects in the parking lot.

Where the temporal AND-OR graph model is obtained by using the pre-established activity corpus of the object in the parking lot.

It is necessary to model the parking lot scene in advance to represent activities (events) of the objects. To build the temporal AND-OR graph (T-AOG), it is necessary to obtain the activity corpora of the objects of the parking lot, which can be regarded as the prior knowledge of parking lot videos. The more comprehensive the object activities (events) are, the more accurate the T-AOG model is.

A construction process of the temporal AND-OR graph model of the embodiment of the disclosure includes the following two steps.

First step: a sample scene video of the parking lot is observed, a corpus of various events about object in the sample scene video is extracted, and an activity corpus of the objects in the parking lot is established.

Specifically, an activity state of the activity corpus of the object in the parking lot is represented by a sub-activity tag, and the event is composed of the set of sub-activities.

By analyzing different sample scene videos of the parking lot, the corpus of the event is obtained, and one of the corpus is the possible combination of leaf nodes appearing in time sequence. For example, the next corpus may represent a video: "closing person_stopping moving_uniformly walking away", which can be expressed as: a person and a vehicle approach, a person don't move, vehicle drives at a constant speed, a vehicle stops, a person passes, a person and a vehicle move away.

In the embodiment of the disclosure, it is required that the obtained scene corpus contains as many events in the scene as possible, so that the object activity prediction can be more accurate.

Second step: for the activity corpus of the objects of the parking lot, an ADIOS-based syntax induction algorithm is used to learn a symbolic syntax structure of each event, and the sub-activity is taken as the terminal node of the temporal AND-OR graph to obtain the temporal AND-OR graph model.

Figure 5:
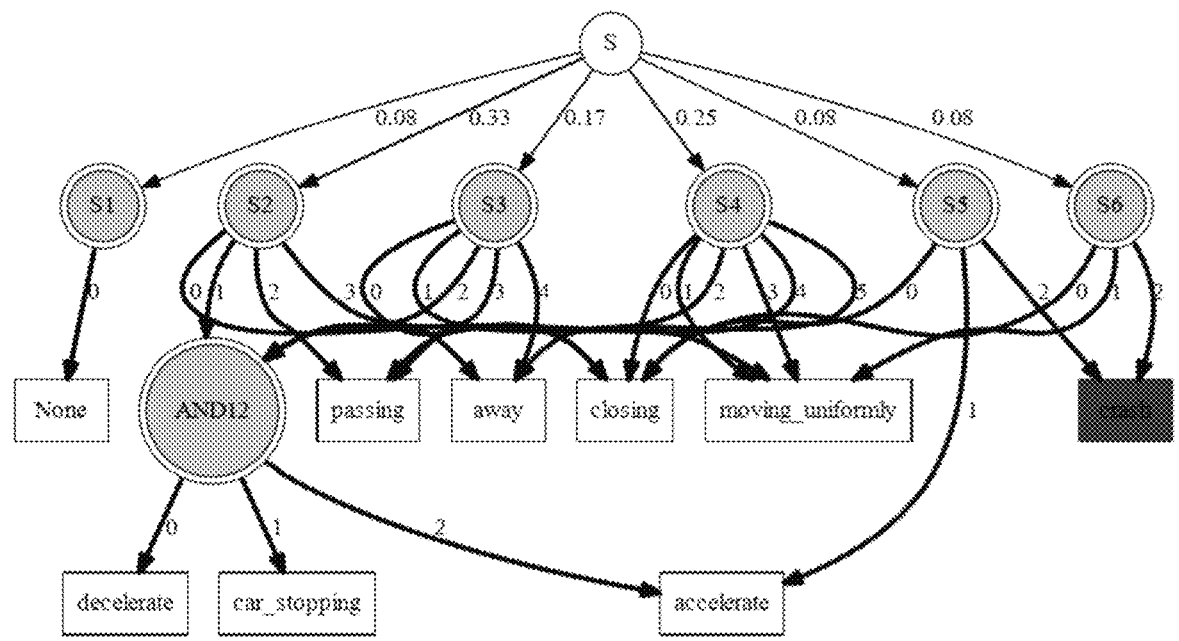
FIG. 5 is a result diagram of a Temporal AND-OR graph (T-AOG) at a fence of an exemplary parking lot according to an embodiment of the disclosure.

Specifically, the ADIOS-based syntax induction algorithm learns And Node and Or Node by generating important patterns and equivalent classes. Firstly, the activity corpus is loaded on a graph whose vertex is a sub-activity, and the graph is expanded by two special symbols (start and end). Each event sample is represented by a separate path on the graph. Then, candidate patterns are generated by traversing different search paths. In each iteration, a statistical significance of each sub-path is tested according to context-sensitive criteria. Important patterns are identified as OR nodes. Then, the algorithm finds the equivalent class by looking for interchangeable units in a given context. The equivalent classes are identified as OR nodes. At the end of iteration, the important pattern is added to the graph as a new node, for replacing the sub-path it contains. Original sequence data of symbol sub-activities can be obtained from the activity corpus of the objects in the parking lot, and the symbol syntax structure of each event can be learned from the original sequence data of symbol sub-activities by using the ADIOS-based syntax induction algorithm. In the embodiment of the disclosure, it tends to use shorter important patterns so that basic grammar units can be captured. The algorithm learns AND nodes and OR nodes by generating important patterns and equivalent classes. As an example, the T-AOG generated by using the corpus of the parking lot is shown in FIG. 5, which is the result diagram of the T-AOG at the fence of the parking lot as an example according to the embodiment of the disclosure. The node of a double-line circle and the node of a single-line circle are AND node and OR node respectively. A number (decimal less than 1) on a branch edge of OR node indicates a branch probability. A number on an edge of the AND node indicates a time sequence of expansion.

After obtaining the temporal AND-OR graph model, for step S4, the following steps can be included: the sub-activity tag set is input into the temporal AND-OR graph model, and a future activity prediction result of the concerned object in the parking lot is obtained by using the online symbol prediction algorithm of Earley parser, and the prediction result includes a future sub-activity tag of the concerned object of and an occurrence probability value of the future sub-activity tag.

Specifically, the sub-activity tag reflects a position relationship or motion state of the paired concerned objects in the future. For step S4, the sub-activity tag set containing each paired concerned objects may be inputted into the temporal AND-OR graph model, and the prediction result may include the future sub-activity tags and the occurrence probability value of each paired concerned objects. Of course, it is also reasonable to input a sub-activity tag set containing a certain paired concerned objects into the temporal AND-OR graph model, and obtain the future sub-activity tags of the paired concerned objects and their occurrence probability values.

In the embodiment of the disclosure, the T-AOG is constructed through the activity corpus of the object of the parking lot, the sub-activity tag set obtained by the S-AOG is used as an input of the T-AOG, and then the online symbol prediction algorithm based on the Earley parser is performed on the T-AOG to predict the next possible sub-activity. The algorithm of the Earley parser is an algorithm for parsing sentences in a given context-free language. The Earley algorithm is designed based on the idea of dynamic programming.

The following describes the symbol prediction algorithm of the Earley parser. The Earley parser reads the terminal symbols in sequence and creates a set of all pending derivatives (states) consistent with the input of the current terminal symbols. Given the next input symbol, the parser iteratively performs one of three basic operations (prediction, scanning and completion) for each state in the current state set.

In the following description, α, β and γ represent a terminal character or a non-terminal character of an arbitrary string (including empty strings), A1 and B1 represent a single non-terminal string, and T represents a terminator.

Use Earley's "⌐" symbol to parse the string: for parsing the string A1, A1, A1→α⌐ β indicates that the symbol α has been parsed, and β is a character to be predicted.

An input position n is defined as a position after accepting the n-th character, and when the input position is 0, it is defined as a position before input. For each input position m, the parser generates a state set S(m). Each state is a tuple (A1→α⌐ β,i), which consists of the following components:

(1) the composition (A1→αβ) of the string currently being matched (2) the dot "⌐" indicates the current resolved position, α has been resolved, and β is a character to be predicted.

(3) i indicates an original position to start matching, and starting and ending positions [i, j] of a character string: an integer i indicates a state starting point (a starting point of the analyzed substring), and an integer j indicates a state ending point (an end point of the analyzed substring), i≤j.

The parser repeatedly performs three operations: predicator, scanner, and Completer:

Predicator: for every state of S(m) in the form of (A1→α ⌐ B1β,i), the dot is followed by a non-terminal character, so every character of string B1 has the possibility of matching. For every parsed character accompanying a grammar in B1, (B1→⌐ γ,m) is added to the left hand side of S(m) (for example, B1→γ);

Scanner: for each state of S(m) in the form of (A1→α ⌐ Tβ), if T is the next symbol in an input stream, since T is the terminal character, the dot scans one character towards to the right. That is, (A1→αT⌐ β,i) is added to S(m+1);

Completer: for each state of S(m) of form (A1→γ⌐ j), a state of the form (B1→α⌐ A1β,i) in S(j) is found, and (B1→α⌐ A1β,i) is added to S(m);

During this process, duplicate states will not be added to the state set. These three operations are repeated until no new states can be added to the state set.

The execution steps of the symbol prediction algorithm with respect to the Earley parser may include:

Assume the inputted sentence have n words, and the character interval can be recorded as 0, 1, . . . , n, that is, n+1 charts are generated.

Step 1: an analytical rule forming state S→•a, [0,0] in the form of S→a in the T-AOG rule into state is added to chart[0].

Step 2: for each state in chart[i], if the current state is "unfinished state" and the terminal character T is not behind it, the Predicator is executed; if the current status is "unfinished status" followed by the terminal character T, the Scanner is executed; if the current status is "completed status", the Completer is executed.

Step 3: if i<n, jump to step 2, otherwise, the analysis is finished.

Step 4: if a state in the form of S→•a,[0,n] is finally obtained, the inputted string is received as a legal matrix, otherwise, the analysis fails.

In the embodiment of the disclosure, the symbol prediction algorithm of the Earley parser is utilized, the current sentence of the sub-activity is used as the input of the Earley parser, and all pending states are scanned to find the next possible terminal node (sub-activity).

Details of the symbol prediction algorithm of Earley parser may be obtained from the introduction of related prior art.

To sum up, in the embodiment of the disclosure, the object activity is represented by the spatio-temporal AND-OR graph (ST-AOG). The spatio-temporal AND-OR graph (ST-AOG) is composed of the spatial AND-OR graph (S-AOG) and the temporal AND-OR graph (T-AOG). The spatio-temporal AND-OR graph can be understood as being constructed by using a root node of the spatial AND-OR graph as a leaf node of the temporal AND-OR graph. S-AOG represents the state of the scene, hierarchically represents the spatial relationship between objects through objects and their attributes, and represents the smallest sub-events (such as sub-event tags such as person standing still, cars accelerating and person and vehicle approaching) through the spatial position relationship obtained by object detection. A root node of the S-AOG is the sub-activity tag, and a terminal node thereof is a relationship between objects. T-AOG is a random time syntax, which means that the event hierarchy is decomposed into several sub-events, simulating the hierarchical structure of the object activity, and its root node is the activity (event) and the terminal node is the sub-activity (sub-event).

Specifically, the learning of ST-AOG can be divided into two main parts: a first part is to learn a symbolic grammar structure of each event/task (T-AOG). A second part is to learn parameters of ST-AOG, including the branch probability of the OR node. Details about ST-AOG are not repeated herein.

In step S5, control information, based on the future activity prediction result of the concerned ones of the objects, is transmitted to a device corresponding to the parking lot.

In an optional embodiment, when the prediction result meet the preset alarm condition, the control information for alarm can be transmitted to an alarm device of the parking lot to control the alarm device to send an alarm signal.

For example, when the prediction result is collision, the control information may be transmitted to the alarm device to control the alarm device to send the alarm signal. The alarm signal may include a sound signal and/or a light signal, etc.

In an optional embodiment, when the prediction result is that the distance between two objects is less than a preset distance value representing the safe distance, the control information can be sent to a warning device, such as a broadcasting device, to control the warning device to send a warning signal to remind the objects to avoid collision.

In an optional embodiment, when the prediction result indicates that the distance between a vehicle and a fence at an exit of the parking lot is less than a preset distance, control information indicating atoll can be sent to the toll device at the exit of the parking lot.

Specifically, in this embodiment, the concerned objects are a vehicle and an exit fence of the parking lot. When the prediction result indicates that the distance between the vehicle and the exit fence of the parking lot is less than the preset distance, for example, when the distance between the head of the vehicle and the exit fence of the parking lot is less than 5 meters, it means that the head of the vehicle approaches the exit fence of the parking lot, which means that the vehicle will drive out of the an exit of the parking lot. Then, control information can be generated by using the prediction result, which contains the prediction result and the control instruction of "preparing to charge", and sent to the toll device at the exit fence of the parking lot, so that the toll device can stop toll time after receiving the control information, and complete toll related work, such as verifying license plate information, making charge settlement, displaying charge amount, and completing charge confirmation.

In an alternative embodiment, when the prediction result indicates that the distance between a vehicle and the exit fence of the parking lot is less than a preset distance, control information indicating release can be sent to the control device at the exit fence of the parking lot.

Specifically, when the prediction result indicates that the distance between a vehicle and the exit fence of the parking lot is less than the preset distance, it means that the vehicle will drive out of an exit of the parking lot, and control information indicating release can be directly sent to the control device at the exit fence of the parking lot, so that the control device can directly open the exit fence of the parking lot after receiving the control information, so that the vehicle can pass quickly.

Of course, based on the prediction result of the future activities of the concerned object, the case of sending control information to the corresponding device of the parking lot is not limited to the above list.

In order to understand the object activity prediction result and effect of the embodiment of the disclosure, an example is given at fence of the parking lot, where speeding and non-stopping is prone to occur, and an accident is prone to occur. Therefore, accurate and rapid activity prediction can reduce many unnecessary dangers and facilitate the effective management and control of the parking lot.

According to the video corpus of the parking lot, the T-AOG model (as shown in FIG. 5) is constructed by using the previous method, and all the events in the scene can be found in this T-AOG model. In view of this scene, the fence of the parking lot is fixed, which can be regarded as a continuous concerned object, and the other concerned objects are mainly vehicles and pedestrians close to the fence. That is, through steps S1 and S2, it is determined that there are two concerned objects: fence and car2.

Through the sub-activity extraction algorithm in step S3, the sub-activity tag set, that is, the statements representing sub-events, is obtained.

The sub-activity tag set is inputted into the T-AOG model, that is, the event statement sentence of the inputted combined sub-activities is as follows:

sentence='closing decelerate car_stopping accelerate'

The On-line symbol prediction algorithm based on the Earley parser is used to predict the next possible sub-activity in T-AOG model.

A program output may be:

---

['closing', ' decelerate ', ' car_stopping ', accelerate ']
(['passing'],[0.33])
(S closing (AND12 decelerate car_stopping accelerate) passing away)
Time elapsed:3.1240177154541

---

Figure 6:
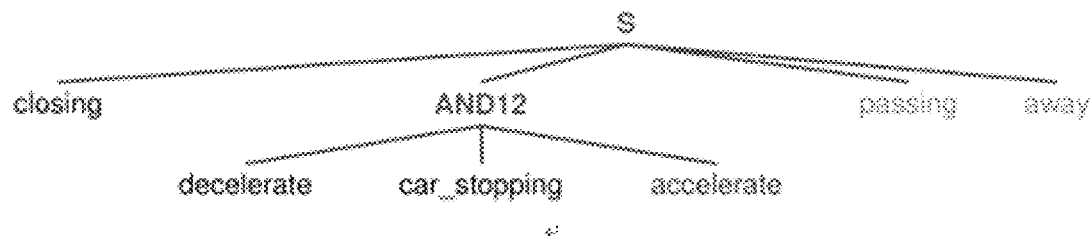
FIG. 6 is a schematic diagram of a prediction analysis tree at a fence of an exemplary parking lot according to an embodiment of the disclosure.
Figure 7:
FIG. 7 is a diagram of an actual position change of a vehicle at a fence of a parking lot in an actual video.

The prediction analytic tree as shown in FIG. 6 is obtained, which is a schematic diagram of the prediction analytic tree at the fence of the parking lot as an example of the embodiment of the disclosure. In the program output, the first line represents the previously observed event statement, which is composed of sub-activities, that is, the first line is the sub-activity tag set. The second line represents the predicted string (sub-activity tag) and probability. The last two lines represent parsing tree statements and prediction time. In the parse tree, the lowermost character "accelerate" represents the observation at the current time, and the right characters "passing" and "away" represent the characters predicted according to the T-AOG model. That is, the predicted next sub-activity is "passing away". Combined with FIG. 7, the change of the actual spatial position relationship between the vehicle and the fence in the video may be seen, and FIG. 7 is a change diagram of the actual position of the vehicle at the fence of the parking lot in the actual video. It can be seen from FIG. 7 that the vehicle car2 on the left side is far away after passing through the fence in the actual video, and it can be seen that the sub-activities among the objects in the actual video are consistent with the predicted sub-activities according to the embodiment of the disclosure. That is, the prediction result of the embodiment of the disclosure is consistent with the change between the objects in the video, which proves that the prediction accuracy of the embodiment of the disclosure is better.

In addition, in the experimental process of sub-activity prediction, the embodiment of the disclosure extracts and analyzes the multi-object sub-activities of the parking lot, and then compares them with the sub-activities in the actual video. The confusion matrix analysis is used to predict the accuracy of the sub-activity results by using the activity prediction method herein.

Specifically, the confusion matrix may be used to analyze the comparison between the spatial position change between actual objects and the detected position change. As shown in Table 1, the highest precision of sub-activity extraction on CAD-120 data set by traditional methods such as an SVM model, a trained double-layer LSTM model, a VGG-16 network of R-CNN, a KGS Markov random field model and an ATCRF is about 87%.

TABLE 1

Accuracy comparison of traditional object detection methods in sub-activity extraction

|  | SVM | LSTM | VGG-16 | KGS | ATCRF |
|---|---|---|---|---|---|
| P/R (%) | 33.4 | 42.3 | — | 83.9 | 87 |

Figure 8:
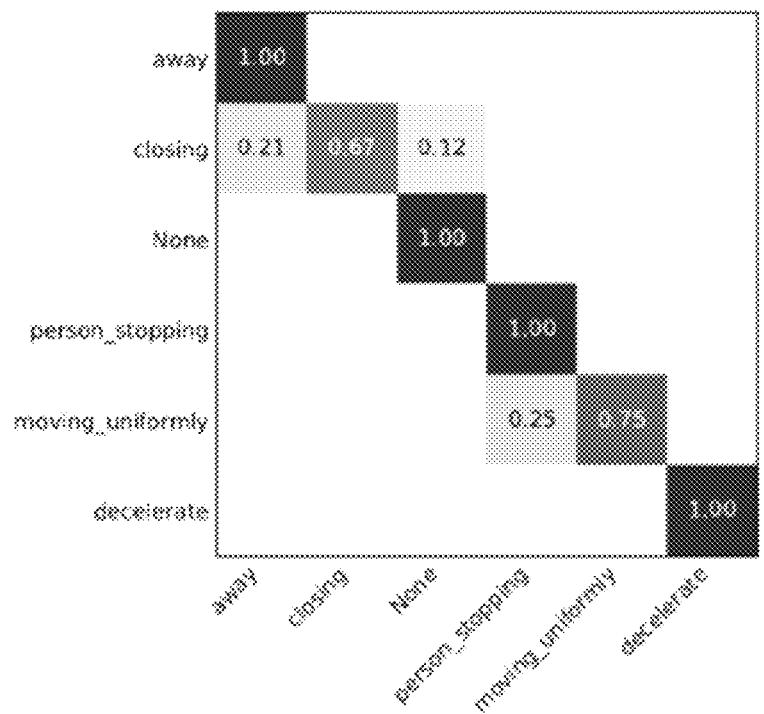
FIG. 8 is a confusion matrix diagram of a predicted sub-activity and an actual sub-activity of an exemplary parking lot according to an embodiment of the disclosure.

Reference is made to FIG. 8, which is a confusion matrix diagram of a predicted sub-activity and an actual sub-activity of a parking lot as an example of an embodiment of the disclosure.

Only some sub-activity tags are illustrated, which includes:

Away (a person is away from a vehicle), closing (a person is close to a vehicle), None (no person or no vehicle), person_stopping (a person stops), moving-uniformly (a vehicle drives uniformly), and decelerate (a vehicle decelerates).

As shown in FIG. 8, an abscissa represents a true value of a sub-activity, and an ordinate represents a predicted value of the sub-activity. It can be calculated from the figure that the predicted sub-activity label basically accords with the actual sub-activity. Its prediction accuracy can reach about 90%, which is higher than that of using traditional object detection methods to get sub-activity tags and then predict them. The result proves that the sub-activity prediction result in the embodiment of the disclosure is very accurate. Therefore, the parking lot can be effectively managed and controlled based on the prediction result.

In the solutions according to the embodiment of the disclosure, a spatio-temporal AND-OR graph is introduced into the field of object activity prediction for the first time. Firstly, the objects in the scene video of the parking lot are detected and tracked, and a spatial AND-OR graph model of the parking lot is generated, where the spatial AND-OR graph model represents a spatial position relationship between the objects. Secondly, a sub-activity extraction is performed on the spatial AND-OR graph model to obtain a sub-activity tag set of the concerned objects and realize advanced semantic extraction of the scene video. Then, the sub-activity tag set is taken as an input of the pre-obtained temporal AND-OR graph model, and a prediction of the next sub-activity is obtained through a temporal syntax of the temporal AND-OR graph model. Finally, the prediction results are used to send control information to the corresponding device of the parking lot to realize the management control of the parking lot. The embodiment of the disclosure can improve the accuracy and instantaneity of the object activity prediction by using the spatio-temporal AND-OR graph, so that the activity of the object in the parking lot can be accurately and quickly predicted, and the purpose of effectively controlling the parking lot can be achieved.

Figure 9:
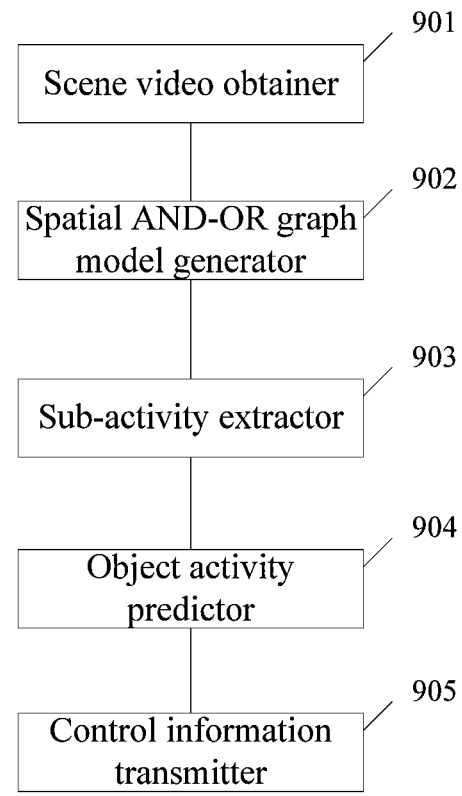
FIG. 9 is a schematic structural diagram of a parking lot management and control device based on object activity prediction, according to an embodiment of the disclosure.

In a second aspect, corresponding to the above method embodiment, an embodiment of the disclosure also provides a parking lot management and control device based on object activity prediction, as shown in FIG. 9, which includes: a scene video obtainer 901, configured to obtain a scene video of a parking lot; a spatial AND-OR graph model generator 902, configured to detect and track an object in the scene video to generate a spatial AND-OR graph model of the parking lot, where the spatial AND-OR graph model represents spatial position relationships of the objects in the scene video; a sub-activity extractor 903, configured to perform a sub-activity extraction on the spatial AND-OR graph model to obtain a sub-activity tag set representing activity states of concerned ones of the objects; an object activity predictor 904, configured to input the sub-activity tag set into a temporal AND-OR graph model to obtain a future activity prediction result of the concerned ones of the objects in the parking lot, where the temporal AND-OR graph model is obtained according to a pre-established object-activity corpus of the parking lot; and a control information transmitter 905, configured to transmit control information, based on the future activity prediction result of the concerned ones of the objects, to a device corresponding to the parking lot.

Optionally, the spatial AND-OR graph model generator 902 includes: an object detector, configured to detect the objects in the scene video by using a pre-trained object detection network to obtain attribute informations of the objects in each of frame images of the scene video; where the attribute informations include position informations of bounding boxes of the respective objects; an object tracker, configured to the same object in the frame images of the scene video, based on the attribute informations of the objects in each of the frame images, by using a preset multi-object tracking algorithm; a distance calculator, configured to determine an actual spatial distance between different ones of the objects in each of the frame images; and a model generator, configured to the spatial AND-OR graph model of the parking lot according to the attribute informations of the objects in each of the frame images after the matching and the actual spatial distance.

Optionally, the object detection network includes a YOLO_v3 network; and the preset multi-object tracking algorithm includes a DeepSort algorithm.

Optionally, the distance calculator is specifically configured to: determine a pixel coordinate of each of the objects in each of the frame images; for each of the objects, calculate an actual coordinate in a world coordinate system corresponding to the pixel coordinate of the object by using a monocular vision positioning and ranging method; and for each of the frame images, obtain the actual spatial distance between each two of the objects in the frame image according to the actual coordinates of the two objects. Optionally, the sub-activity extractor 903 is specifically configured to: determine paired objects of which the actual spatial distance is less than a preset distance threshold in the spatial AND-OR graph model as the concerned ones of the objects; for each the frame image, determine the actual spatial distance of each paired objects in the concerned ones of the objects and speed values of the concerned ones of the objects; compare every successive two of the frame images of the scene video in sequence to obtain distance change information representing changes of the actual spatial distance of each paired objects in the concerned ones of the objects and to obtain speed change information representing changes of the speed values of the concerned ones of the objects; and describe the distance change information and the speed change information associated with the concerned ones of the objects by semantic tags to generate the sub-activity tag set representing the activity states of the concerned ones of the objects.

Optionally, the object activity predictor 904 is specifically configured to: input the sub-activity tag set into the temporal AND-OR graph model, and obtaining the future activity prediction result of the concerned ones of the objects in the parking lot by using an online symbol prediction algorithm of an Earley parser, where the future activity prediction result includes future sub-activity tags and probabilities of occurrence of the concerned ones of the objects.

Optionally, the control information transmitter 905 is specifically configured to: transmit the control information indicating a toll to a toll device at an exit of the parking lot, in a situation of the future activity prediction result indicating a distance between a vehicle and a fence at the exit of parking lot being less than a preset distance.

For the specific execution process of each device, please refer to the method steps in the first aspect, and will not repeat them.

In the solutions according to the embodiment of the disclosure, a spatio-temporal AND-OR graph is introduced into the field of object activity prediction for the first time. Firstly, the objects in the scene video of the parking lot are detected and tracked, and a spatial AND-OR graph model of the parking lot is generated, where the spatial AND-OR graph model represents a spatial position relationship between the objects. Secondly, a sub-activity extraction is performed on the spatial AND-OR graph model to obtain a sub-activity tag set of the concerned objects and realize advanced semantic extraction of the scene video. Then, the sub-activity tag set is taken as an input of the temporal AND-OR graph model, and a prediction of the next sub-activity is obtained through a temporal syntax of the temporal AND-OR graph model. Finally, control information is transmitted to the corresponding device of the parking lot according the prediction result and thereby to realize the management and control of the parking lot. The embodiment of the disclosure can improve the accuracy and instantaneity of the object activity prediction by using the spatio-temporal AND-OR graph, so that the activity of the object in the parking lot can be accurately and quickly predicted, and the purpose of effectively controlling the parking lot can be achieved.

Figure 10:
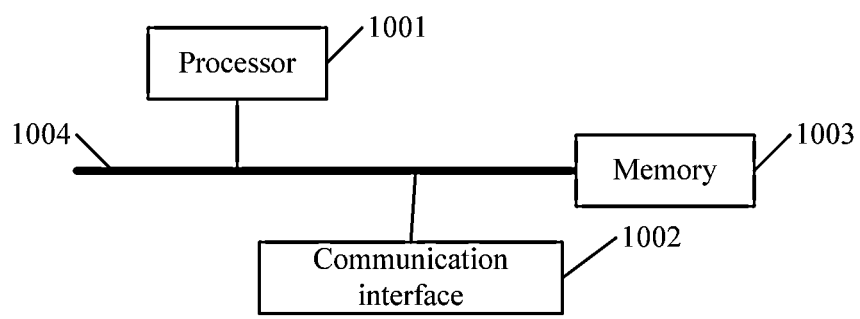
FIG. 10 is a schematic structural diagram of an electronic device according to an embodiment of the disclosure.

In a third aspect, an embodiment of the disclosure also provides an electronic device, as shown in FIG. 10, which includes a processor 1001, a communication interface 1002, a memory 1003 and a communication bus 1004, where the processor 1001, the communication interface 1002 and the memory 1003 communicate with one another through the communication bus 1004, the memory 1003 is configured to store a computer program; and the processor 1001 is configured to implement the parking lot management and control method based on object activity prediction according to the first aspect when executing the program stored in the memory 1003.

The electronic device may be a desktop computer, a portable computer, an intelligent mobile terminal, a server and the like. Any electronic device that can be used to realize the disclosure belongs to the protection scope of the disclosure and is not limited herein.

The communication bus in the above electronic device can be a peripheral component interconnect (PCI) bus or an extended industry standard architecture (EISA) bus, etc. The communication bus may include an address bus, a data bus, a control bus and the like. For purpose of illustration, only one thick line is used in the drawings, but it does not mean that there is only one bus or one type of bus.

The communication interface is used for communication between the electronic device and other devices.

The memory may include a random access memory (RAM) or a Non-Volatile Memory (NVM), such as at least one disk memory. Optionally, the memory may also be at least one storage device located far away from the processor.

The processor may be a general-purpose processor, including a Central Processing Unit (CPU), a Network Processor (NP), etc. Further, the processor may also be a Digital Signal Processing (DSP), an application specific integrated circuit (ASIC), a Field-Programmable Gate Array (FPGA) or other programmable logic devices, a discrete gate or transistor logic device, and a discrete hardware component.

In a fourth aspect, corresponding to the parking lot management and control method based on object activity prediction provided in the first aspect, an embodiment of the disclosure provides a non-transitory computer-readable storage medium, in which a computer program is stored, and when the computer program is executed by a processor, the computer program causes the processor to carry out steps of the parking lot management and control method based on object activity prediction according to the embodiment of the disclosure.

The above non-transitory computer-readable storage medium stores an application program for executing the parking lot management and control method based on object activity prediction according to the embodiment of the disclosure when running.

For the device/electronic device/storage medium embodiment, since it is basically similar to the method embodiment, the description is relatively simple, and relevant points can be found in the partial description of the method embodiment.

It should be noted that the device, the electronic device and the storage media of the embodiments of the disclosure are a device, an electronic device and a storage media applying the above parking lot management and control method based on object activity prediction, so all embodiments of the above parking lot management and control method based on object activity prediction are applicable to the devices, electronic device and storage media, and can achieve the same or similar beneficial effects.

It should be noted that relational terms such as first and second herein are only used to distinguish one entity or operation from another entity or operation, and do not necessarily require or imply any such actual relationship or order between these entities or operations. Furthermore, the terms "including", "comprising" or any other variation thereof are intended to cover non-exclusive inclusion, so that a process, a method, an article or a device including a series of elements includes not only those elements, but also other elements not explicitly listed, or elements inherent to such process, method, article or device. Without further restrictions, the elements defined by the sentence "including one . . . " do not exclude the existence of other identical elements in a process, a method, an article or a device including the elements.

The above is only a preferred embodiment of the disclosure, and is not intended to limit the scope of protection of the disclosure. Any modification, equivalent substitution, improvement and the like which made within the spirit and principle of the disclosure are included in the protection scope of the disclosure.

What is claimed is:

1. A parking lot management and control method based on object activity prediction, comprising:

obtaining a scene video of a parking lot;

detecting and tracking objects in the scene video to generate a spatial AND-OR graph model of the parking lot, where the spatial AND-OR graph model represents spatial position relationships of the objects in the scene video;

performing a sub-activity extraction on the spatial AND-OR graph model to obtain a sub-activity tag set representing activity states of concerned ones of the objects;

inputting the sub-activity tag set into a temporal AND-OR graph model to obtain a future activity prediction result of the concerned ones of the objects in the parking lot, wherein the temporal AND-OR graph model is obtained according to a pre-established object-activity corpus of the parking lot; and transmitting control information, based on the future activity prediction result of the concerned ones of the objects, to a device corresponding to the parking lot.

2. The method according to claim 1, wherein detecting and tracking objects in the scene video to generate a spatial AND-OR graph model of the parking lot, comprises:

detecting the objects in the scene video by using a pre-trained object detection network to obtain attribute informations of the objects in each of frame images of the scene video, wherein the attribute informations comprise position informations of bounding boxes of the respective objects;

matching the same object in the frame images of the scene video, based on the attribute informations of the objects in each of the frame images, by using a preset multi-object tracking algorithm;

determining an actual spatial distance between different ones of the objects in each of the frame images; and generating the spatial AND-OR graph model of the parking lot according to the attribute informations of the objects in each of the frame images after the matching and the actual spatial distance.

3. The method according to claim 2, wherein the object detection network comprises a YOLO_v3 network, and the preset multi-object tracking algorithm comprises a DeepSort algorithm.

4. The method according to claim 2, wherein determining an actual spatial distance between different ones of the objects in each of the frame images, comprises:

determining a pixel coordinate of each of the objects in each of the frame images;

for each of the objects, calculating an actual coordinate in a world coordinate system corresponding to the pixel coordinate of the object by using a monocular vision positioning and ranging method; and for each of the frame images, obtaining the actual spatial distance between each two of the objects in the frame image according to the actual coordinates of the two objects.

5. The method according to claim 4, wherein performing a sub-activity extraction on the spatial AND-OR graph model to obtain a sub-activity tag set representing activity states of concerned ones of the objects, comprises:

determining paired objects of which the actual spatial distance is less than a preset distance threshold in the spatial AND-OR graph model as the concerned ones of the objects;

for each of the frame images, determining the actual spatial distance of each paired objects in the concerned ones of the objects and speed values of the concerned ones of the objects;

comparing every successive two of the frame images of the scene video in sequence to obtain distance change information representing changes of the actual spatial distance of each paired objects in the concerned ones of the objects and to obtain speed change information representing changes of the speed values of the concerned ones of the objects; and describing the distance change information and the speed change information associated with the concerned ones of the objects by semantic tags to generate the sub-activity tag set representing the activity states of the concerned ones of the objects.

6. The method according to claim 5, wherein inputting the sub-activity tag set into a temporal AND-OR graph model to obtain a future activity prediction result of the concerned ones of the objects in the parking lot, comprises:

inputting the sub-activity tag set into the temporal AND-OR graph model, and obtaining the future activity prediction result of the concerned ones of the objects in the parking lot by using an online symbol prediction algorithm of an Earley parser, wherein the future activity prediction result comprises future sub-activity tags and probabilities of occurrence of the concerned ones of the objects.

7. The method according to claim 1, wherein transmitting control information, based on the future activity prediction result of the concerned ones of the objects, to a device corresponding to the parking lot, comprises:

transmitting the control information indicating a toll to a toll device at an exit of the parking lot, in a situation of the future activity prediction result indicating a distance between a vehicle and a fence at the exit of parking lot being less than a preset distance.

8. An electronic device comprising a processor, a communication interface, a memory and a communication bus, wherein the processor, the communication interface and the memory are mutually communicated with one another through the communication bus;

wherein the memory is configured to store a computer program; and wherein the processor is configured to execute the computer program stored in the memory to carry out a parking lot management and control method based on object activity prediction, and the method comprising:

obtaining a scene video of a parking lot;

detecting and tracking objects in the scene video to generate a spatial AND-OR graph model of the parking lot, wherein the spatial AND-OR graph model represents spatial position relationships of the objects in the scene video;

performing a sub-activity extraction on the spatial AND-OR graph model to obtain a sub-activity tag set representing activity states of concerned ones of the objects;

inputting the sub-activity tag set into a temporal AND-OR graph model to obtain a future activity prediction result of the concerned ones of the objects in the parking lot, wherein the temporal AND-OR graph model is obtained according to a pre-established object-activity corpus of the parking lot; and transmitting control information, based on the future activity prediction result of the concerned ones of the objects, to a device corresponding to the parking lot.

9. The electronic device according to claim 8, wherein detecting and tracking objects in the scene video to generate a spatial AND-OR graph model of the parking lot, comprises:

detecting the objects in the scene video by using a pre-trained object detection network to obtain attribute informations of the objects in each of frame images of the scene video, wherein the attribute informations comprise position informations of bounding boxes of the respective objects;

matching the same object in the frame images of the scene video, based on the attribute informations of the objects in each of the frame images, by using a preset multi-object tracking algorithm;

determining an actual spatial distance between different ones of the objects in each of the frame images; and generating the spatial AND-OR graph model of the parking lot according to the attribute informations of the objects in each of the frame images after the matching and the actual spatial distance.

10. The electronic device according to claim 9, wherein the object detection network comprises a YOLO_v3 network, and the preset multi-object tracking algorithm comprises a DeepSort algorithm.

11. The electronic device according to claim 9, wherein determining an actual spatial distance between different ones of the objects in each of the frame images, comprises:

determining a pixel coordinate of each of the objects in each of the frame images;

for each of the objects, calculating an actual coordinate in a world coordinate system corresponding to the pixel coordinate of the object by using a monocular vision positioning and ranging method; and for each of the frame images, obtaining the actual spatial distance between each two of the objects in the frame image according to the actual coordinates of the two objects.

12. The electronic device according to claim 11, wherein performing a sub-activity extraction on the spatial AND-OR graph model to obtain a sub-activity tag set representing activity states of concerned ones of the objects, comprises:

determining paired objects of which the actual spatial distance is less than a preset distance threshold in the spatial AND-OR graph model as the concerned ones of the objects;

for each of the frame images, determining the actual spatial distance between each paired objects in the concerned ones of the objects and speed values of the concerned ones of the objects;

comparing every successive two of the frame images of the scene video in sequence to obtain distance change information representing changes of the actual spatial distance of each paired objects in the concerned ones of the objects and to obtain speed change information representing changes of the speed values of the concerned ones of the objects; and describing the distance change information and the speed change information associated with the concerned ones of the objects by semantic tags to generate the sub-activity tag set representing the activity states of the concerned ones of the objects.

13. The electronic device according to claim 12, wherein inputting the sub-activity tag set into a temporal AND-OR graph model to obtain a future activity prediction result of the concerned ones of the objects in the parking lot, comprises:

inputting the sub-activity tag set into the temporal AND-OR graph model, and obtaining the future activity prediction result of the concerned ones of the objects in the parking lot by using an online symbol prediction algorithm of an Earley parser, wherein the future activity prediction result comprises future sub-activity tags and probabilities of occurrence of the concerned ones of the objects.

14. The electronic device according to claim 8, wherein transmitting control information, based on the future activity prediction result of the concerned ones of the objects, to a device corresponding to the parking lot, comprises:

transmitting the control information indicating a toll to a toll device at an exit of the parking lot, in a situation of the future activity prediction result indicating a distance between a vehicle and a fence at the exit of parking lot being less than a preset distance.

15. A non-transitory computer-readable storage medium, wherein a computer program is stored in the non-transitory computer-readable storage medium, and when executed by a processor, causes the processor to carry out a parking lot management and control method based on object activity prediction, and the method comprising:

obtaining a scene video of a parking lot;

detecting and tracking objects in the scene video to generate a spatial AND-OR graph model of the parking lot, wherein the spatial AND-OR graph model represents spatial position relationships of the objects in the scene video;

performing a sub-activity extraction on the spatial AND-OR graph model to obtain a sub-activity tag set representing activity states of concerned ones of the objects;

inputting the sub-activity tag set into a temporal AND-OR graph model to obtain a future activity prediction result of the concerned ones of the objects in the parking lot, wherein the temporal AND-OR graph model is obtained according to a pre-established object-activity corpus of the parking lot; and transmitting control information, based on the future activity prediction result of the concerned ones of the objects, to a device corresponding to the parking lot.

16. The non-transitory computer-readable storage medium according to claim 15, wherein detecting and tracking objects in the scene video to generate a spatial AND-OR graph model of the parking lot, comprises:

detecting the objects in the scene video by using a pre-trained object detection network to obtain attribute information of the objects in each of frame images of the scene video, wherein the attribute information comprise position information of bounding boxes of the respective objects;

matching the same object in the frame images of the scene video, based on the attribute information of the objects in each of the frame images, by using a preset multi-object tracking algorithm;

determining an actual spatial distance between different ones of the objects in each of the frame images; and generating the spatial AND-OR graph model of the parking lot according to the attribute information of the objects in each of the frame images after the matching and the actual spatial distance.

17. The non-transitory computer-readable storage medium according to claim 16, wherein the object detection network comprises a YOLO_v3 network, and the preset multi-object tracking algorithm comprises a DeepSort algorithm.

18. The non-transitory computer-readable storage medium according to claim 16, wherein determining an actual spatial distance between different ones of the objects in each of the frame images, comprises:

determining a pixel coordinate of each of the objects in each of the frame images;

for each of the objects, calculating an actual coordinate in a world coordinate system corresponding to the pixel coordinate of the object by using a monocular vision positioning and ranging method; and for each of the frame images, obtaining the actual spatial distance between each two of the objects in the frame image according to the actual coordinates of the two objects.

19. The non-transitory computer-readable storage medium according to claim 18, wherein performing a sub-activity extraction on the spatial AND-OR graph model to obtain a sub-activity tag set representing activity states of concerned ones of the objects, comprises:

determining paired objects of which the actual spatial distance is less than a preset distance threshold in the spatial AND-OR graph model as the concerned ones of the objects;

for each of the frame images, determining the actual spatial distance between each paired objects in the concerned ones of the objects and speed values of the concerned ones of the objects;

comparing every successive two of the frame images of the scene video in sequence to obtain distance change information representing changes of the actual spatial distance of each paired objects in the concerned ones of the objects and to obtain speed change information representing changes of the speed values of the concerned ones of the objects; and describing the distance change information and the speed change information associated with the concerned ones of the objects by semantic tags to generate the sub-activity tag set representing the activity states of the concerned ones of the objects.

20. The non-transitory computer-readable storage medium according to claim 19, wherein inputting the sub-activity tag set into a temporal AND-OR graph model to obtain a future activity prediction result of the concerned ones of the objects in the parking lot, comprises:

inputting the sub-activity tag set into the temporal AND-OR graph model, and obtaining the future activity prediction result of the concerned ones of the objects in the parking lot by using an online symbol prediction algorithm of an Earley parser, wherein the future activity prediction result comprises future sub-activity tags and probabilities of occurrence of the concerned ones of the objects.

* * * * *